May 22, 1923.
M. RESK
1,456,075
AUTOMATIC PUNCTURE CLOSING DEVICE FOR PNEUMATIC TIRES
Filed July 27, 1922
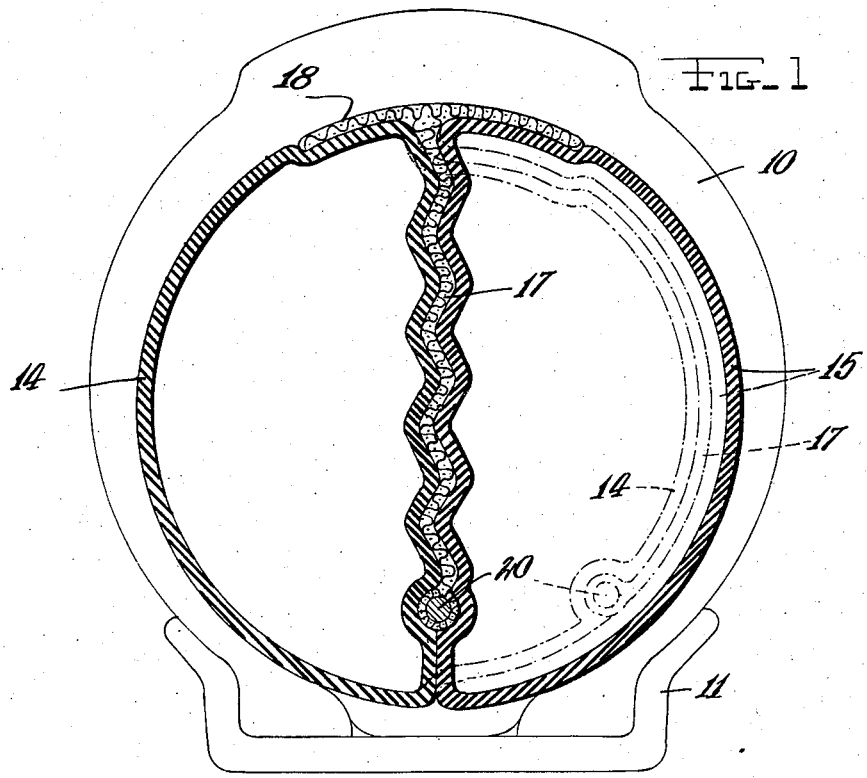
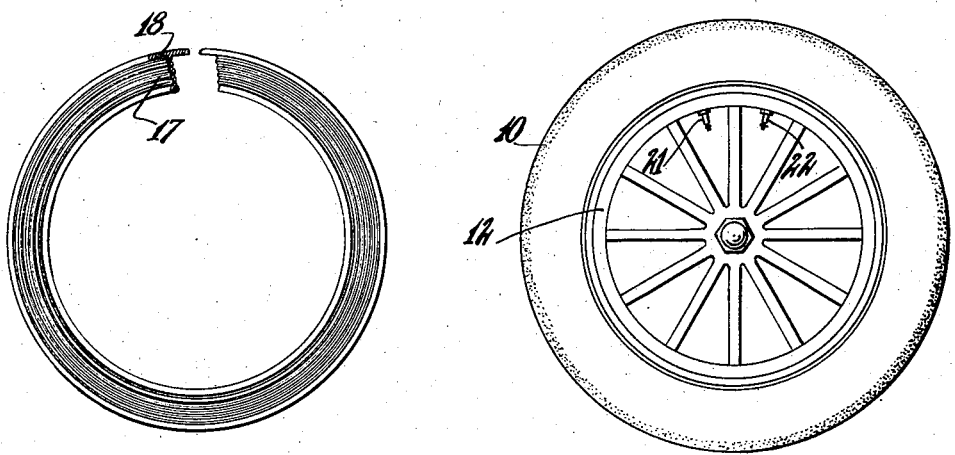
Inventor
Michell Resk
By Zoltan Polacheck
Attorney Patented May 22, 1923.

1,456,075

UNITED STATES PATENT OFFICE.

MICHELL RESK, OF NEW YORK, N. Y.

AUTOMATIC PUNCTURE-CLOSING DEVICE FOR PNEUMATIC TIRES.

Application filed July 27, 1922. Serial No. 577,933.

*To all whom it may concern:*

Be it known that I, MICHELL RESK, a citizen of France, residing at New York, in the county of New York and State of New York, have invented certain new and useful Improvements in Automatic Puncture-Closing Devices for Pneumatic Tires, of which the following is a specification.

This invention relates to pneumatic tires for automobiles or other vehicles, having particular reference to the features of tire construction relating to the retention of the air.

The invention has for an object the provision of a simple construction permitting continued use of the tire after a puncture or blow-out.

For further comprehension of the invention, and of the objects and advantages thereof, reference will be had to the following description and accompanying drawings, and to the appended claims in which the various novel features of the invention are more particularly set forth.

Fig. 1 of the drawings is a cross section of a tire having the invention embodied therein.

Fig. 2 is a fragmentary face view of a wheel having the tire applied thereto.

Fig. 3 is a face view, with parts broken away, of the inside protecting ring.

In the drawings the reference numeral 10 indicates an outer tube or shoe of ordinary construction which is shown as mounted on an ordinary rim 11, which fits in the usual manner on the wheel, indicated at 12.

According to my invention I place in the tube or shoe 10, instead of a single air tube as is common, a pair of tubes 14, 15 which are each of the full size adapted to fit in the shoe 10 and which lie side by side in the latter as shown in Fig. 1 of the drawings.

Between these tubes 14, 15 I fit a web 17 of leather or of any tough fabric which unites at its outer edge with a ring 18 of like material resting against the inner face of the shoe and partially overlapping each inner tube. At its inner edge this web is connected to an annular wire 20 which is spaced outwardly a slight distance from the rim 11. As will be understood, each inner tube is provided with a separate air valve, the respective valves being indicated at 21 and 22 in Fig. 2, the holes in the rim 11 and the wheel felly to receive said valve being placed close together, circumferentially considered, so as to permit of placing of the rim on the felly. As indicated by the convoluted showing of the web 17 in Fig. 1 of the drawing the said web is of greater width from its inner to its outer edge than the actual radial distance between the wire 20 and the ring 18. By this construction the web is permitted to bulge the side to lie against the side of the tire, as indicated by the dot and dash lines in Fig. 1.

As is known, punctures or blow-outs in pneumatic tires generally occur at the side between the rim and the thickened tread portion. In the event then, of a puncture or blow-out only one of the inner tubes will collapse the remaining tube expanding under the pressure of the air therein and filling the shoe. As this tube expands it forces the tough web 17 against the side of the shoe in which the hole due to the blow-out is located, thus closing said hole and forming a protecting cover for the expanded tube at this point. If convenient, additional air may be pumped into the expanded inner tube, although the air already in the latter will give the tire sufficient resiliency to permit of traveling.

Having thus described my invention what I claim as new and desire to protect by Letters Patent of the United States is as follows:—

1. A pneumatic tire comprising a shoe, a pair of inner tubes arranged side by side in said shoe, and an annular web of tough flexible inelastic material inserted freely between said inner tubes, the dimension of said web between its inner and outer edges being greater than the actual radial distance between said inner and outer edges to permit of said web bulging to one side against the shoe.

2. A pneumatic tire comprising a shoe, a pair of inner tubes arranged side by side in said shoe, and an annular web of tough flexible inelastic material inserted freely between said inner tubes, in the dimension of said web between its inner and outer edges being greater than the actual radial distance between said inner and outer edges to permit of said web bulging to one side against the shoe, said web having a cross piece extending around its outer edge and overlapping each of said inner tubes, and a metal annulus to which the inner edge of said web is attached.

3. A pneumatic tire comprising a shoe, and a pair of inner tubes arranged side by side in said shoe, and an annular web of tough flexible material inserted freely between said inner tubes, and a metal annulus to which the inner edge of said web is attached.

In testimony whereof I have affixed my signature.

MICHELL RESK.